United States Patent
Hodge

[11] 3,988,678
[45] Oct. 26, 1976

[54] CIRCUIT ARRANGEMENT FOR THE MEASURING OF GROUP DELAY AND ATTENUATION DISTORTIONS

[75] Inventor: Stephen R. Hodge, Edinburgh, Scotland

[73] Assignee: Hewlett-Packard Limited, West Lothian, Scotland

[22] Filed: Oct. 14, 1975

[21] Appl. No.: 622,297

Related U.S. Application Data

[63] Continuation of Ser. No. 551,878, Feb. 21, 1975, abandoned.

[30] Foreign Application Priority Data

June 3, 1974 United Kingdom................ 24573/74

[52] U.S. Cl. .................................................. 325/67
[51] Int. Cl.² ............................................ H04B 1/00
[58] Field of Search...................... 325/67, 363, 65

[56] References Cited
UNITED STATES PATENTS

3,875,500    4/1975    Wallace............................... 325/67

*Primary Examiner*—Benedict V. Safourek
*Assistant Examiner*—Michael A. Masinick
*Attorney, Agent, or Firm*—Allston L. Jones; Roland I. Griffin

[57] ABSTRACT

This invention relates to slave controlled forward, reverse or third point measurements of at least one of group delay and attenuation distortions of any of a number of transmission sections connected in a measuring loop between a local transmitter and a local receiver. A swept test carrier frequency signal and a fixed reference carrier frequency signal are amplitude modulated by the same modulating frequency and are applied to the transmission section under test in a periodically alternating sequence. After passing through the transmission section under test, the thus generated envelopes of both signals will have suffered a time delay as well as an amplitude degradation caused by the frequency dependent group delay and attenuation characteristics of the transmission section under test. If a remote transmission section should be measured, a remote control signal is supplied from the local transmitter to the remote receiver-transmitter set, which specifies parameters of the test signal to be delivered by said slave controlled remote transmitter. If an envelope signal detected by a remote receiver should be retransmitted to the local receiver, a second control signal is supplied from the local transmitter to enable the respective remote transmitter to remodulate said envelope signal onto a carrier signal, the frequency whereof is the reference carrier frequency and the amplitude whereof is constant. The selection between remote control and remodulation modes of any remote receiver-transmitter set is solely made by means of those two control signals from the local transmitter without the need of any operator in any remote receiver-transmitter set.

15 Claims, 4 Drawing Figures

NETWORK FOR THIRD POINT MEASUREMENTS

Fig.1 NETWORK FOR THIRD POINT MEASUREMENTS

CIRCUIT ARRANGEMENT FOR THE MEASURING OF GROUP DELAY AND ATTENUATION DISTORTIONS

This is a continuation of application Ser. No. 551,878, filed Feb. 21, 1975, now abandoned.

CROSS REFERENCE TO RELATED APPLICATION

This application is related to the co-pending U.S. patent application Ser. No. 551,891, now U.S. Pat. No. 3,970,926, entitled "Method and Apparatus for Measuring the Group Delay Characteristics of a Transmission Path" that was filed for the same assignee on the same day as this application.

BACKGROUND OF THE INVENTION

This invention relates to slave controlled forward, reverse or third point measurements of group delay and/or attenuation distortions of any of a number of transmission sections connected in a measuring loop between a local transmitter and a local receiver.

The principle of measuring group delay and attenuation distortions according to H. Nyquist and S. Brand in "Measurement of Phase Distortion"; Bell System Tech. Journal 9; (1930), page 522 and modifications thereof are summarized in the copending U.S. patent application entitled "Method and Apparatus for Measuring the Group Delay Characteristics of a Transmission Path" that was filed for the same assignee and on the same day as this application. The contents of that application are included by reference.

There are certain transmission line configurations where it may be desirable to make a measurement at a remote point of a transmission section under test and to have the result available at a point in the network other than at that point where it was made.

For example, a commonly encountered measuring problem involves the measurement of group delay and attenuation distortions over a transmission section under test extending between the transmitter of a receiver-transmitter set and the receiver of another receiver-transmitter set, where both measuring sets are at remote locations from a local measuring station including a receiver-transmitter set, and the transmission path under test passes through the local measuring station. A closed loop has to be established from the local transmitter to the receiver of the measuring set at the remote end of the departing section, from the receiver to the transmitter at the same location, from this transmitter to the receiver at the other end of the transmission section with its two partial sections ending at the local measuring station, from this receiver to the transmitter at the same location and back to the local receiver via the arriving section.

In the German Patent specification No. 2,221,256 an apparatus is disclosed for selective remote control and remodulation mode which contains manually operable switches interconnected between the receiver and transmitter of each remote measuring set. A remote operator has to establish or interrupt certain circuit connections in order to establish remote control or remodulation mode operation. Furthermore, if measurements over extended sections are performed and consequently the level of the reference carrier signal suffers substantial attenuation losses, these losses have to be compensated by the remote operator in the remodulation mode, if an unallowable dynamic range of the measuring apparatus or of the transmission path should be avoided.

SUMMARY OF THE INVENTION

This invention provides a circuit arrangement for measuring group delay and/or attenuation distortion of departing, remote, or arriving transmission sections without requiring any personnel outside the local measuring station while remote control and remodulation operating modes are being selectively performed.

This invention also provides a slave control circuit that adds only a limited number of components to the standard measuring sets.

Furthermore, a remodulation circuit is proposed which allows the remodulation of remote resultant signals onto the reference carrier signal even if the reference carrier signal has suffered considerable attenuation losses due to the attenuation characteristics of transmissions ection(s) under test.

The invention includes a circuit arrangement such that it is no longer necessary for operators at one or several remote locations to connect or disconnect circuit connections according to instructions, for example, by telephone, from the operator at the central office. This feature significantly helps to avoid measuring errors and to decrease the expenses involved in performing the tests of a plurality of transmission sections.

Obviously, the novel slave control concept of this invention is not restricted to either analog or digital measuring sets or to a specific way of measuring delay and/or attenuation distortions.

According to a preferred embodiment, the slave control circuit includes a gating circuit connected to the modulation input of the modulator in the local transmitter and that gating circuit has a control input connected to a manually operable mode switch. Thus, by means of a simple extra circuitry, the modulation envelope can be modified, preferably suppressed, during part of either the measuring period or the reference period in order to initiate, in arbitrary sequence, remote control or remodulation mode.

The novel circuit is further improved by connecting the control input of the slave control circuit through one position of the manually operable mode switch to a carrier change-over signal generator to inhibit the gating circuit so that no modulating signal is presented to the output modulator during the measuring period. Thus the output signal of the local transmitter is not modulated during the measuring signal period.

Slave control detectors are also included in each of the remote receivers and that detector includes a gating circuit connected to a timing circuit in the corresponding remote receiver to receive a demodulated split frequency envelope signal only during the measuring frequency period of the carrier signal. Thus, no additional modulation frequencies or modulators are needed to control slave functions.

Upon receipt of a split frequency modulated measuring frequency carrier signal from the output modulator of the local transmitter, the slave control detector causes a switching unit in the corresponding interfacing circuit to establish or maintain the circuit connections between the respective receiver and the transmitter for remodulation while a trigger signal from a trigger circuit in the slave control detector upon receipt of an unmodulated measuring frequency carrier signal causes the same switching unit to establish the circuit connection for remote control of the corresponding transmitter.

According to another aspect of this invention, the circuit arrangement includes a remodulation envelope modifying circuit in each of the interfacing circuits. This remodulation circuit receives input signals that are related to the relative amplitude and/or time variations of the periodically alternating envelope signals from the corresponding remote receiver and supplies to the amplitude modulator of corresponding remote transmitter remodulation envelope signals containing the same relative amplitude and/or relative time variations but with a preselected constant mean reference carrier frequency level. The remodulation circuit further includes a constant level amplifier circuit with a signal input from the corresponding remote receiver, a control input and a feedback circuit connected between the amplifier output and its control input, a level detection and comparison circuit connected within the feedback circuit to derive a signal related to the actual mean reference carrier signal level, a source for a reference signal related to the desired mean reference carrier signal applied to a reference input of the level detection and comparison circuit which compares the actual mean reference carrier signal with this reference signal and supplies a control signal with such a polarity to control the input of the amplifier so that the mean level of the reference carrier signal at the output of the remodulation envelope modifying circuit is kept at a constant preselected value. The remodulation circuit also includes a reference carrier generating circuit having an input from the corresponding remote receiver as well as an output connected to a carrier frequency synthesizer of the corresponding remote transmitter when the slave controlled electronic switching unit is in the remodulating mode to supply a sine wave carrier signal to the corresponding remote transmitting modulator at the receiver reference carrier frequency with a predetermined fixed amplitude. Thus, the reference carrier output signal used for remodulating the carrier is kept at a constant level independent of any attenuation distortions of the reference carrier signal in the receiver. The reference carrier level used for remodulation can be calibrated so that not only the absolute loss in the return direction is always known, but also the output level may be made as high as the system will accommodate, thus ensuring maximum freedom from interfering effects in the return direction and also removing the need for a very large dynamic range in the modulator of the remote transmitter unit. This may be clarified by an example: Suppose a four wire circuit is being tested and has minimum loss at the reference frequency (say 1.8 kHz) of 20 dB in each direction. Suppose also that the measurement is being made at the edge of the band (3.4 kHz) where the relative amplitude is 25 dB below the reference. For a local receiver-transmitter set sending at 0 dBm, the received levels are −20 dBm (reference level) and −45 dBm (measurement level). If these levels were remodulated directly onto the reference frequency carrier, the sent levels at the remote end will also be −20 and −45 dBm respectively, implying a 55 dB dynamic range for the remote end modulator (assuming a maximum level of +10 dBm) and received levels of −40 and −65 dBm at the local end. However, if according to this novel concept 20 dB of gain were applied at the remote end so that the reference level were brought back to the calibrated level (say 0 dBm again), then the measurement level would be −25 dBm at the input to the return line. The modulator would now only require 35 dB dynamic range and the local received levels would be −20 and −45 dBm respectively. The relative amplitude is still 25 dB and the group delay is also unchanged.

In a preferred circuit for providing a constant level remodulation signal the level detection and comparison circuit may include an integrating differential amplifier having a signal input for receiving the alternating measuring and reference carrier envelopes and a timing input connected to a timing circuit which under the control of the corresponding remote receiver activates the integrating amplifer periodically during a part of the reference envelope period to form a signal that is related to the mean reference carrier level and to compare this signal with the reference signal at its other input.

The circuit for maintaining a constant level of the reference carrier signal used for remodulation may be further improved in that the amplifier circuit includes an antilog amplifier connected to the differential amplifier, where the input signal of the differential amplifier is to be connected to a logged, periodically alternating envelope signal from the receiver which still contains a relative amplitude and time or phase shift information between alternating envelope periods. The amount of gain applied is made such that the retransmitted reference level is always equal to the calibration indicated on the attenuator controls of the remote transmitter.

DESCRIPTION OF THE PREFERRED EMBODIMENT

Before explaining the overall function of the novel slave control measurement system, the underlying principles of measuring group delay and attenuation distortion are outlined. These principles are discussed and partially claimed in the copending U.S. patent application entitled "Method and Apparatus for Measuring the Group Delay Characteristics of a Transmission Path," which is filed on the same day and by the same assignee as this application. However, the concept of this invention is not only useful in connection with the specific measuring method illustrated in said referenced patent application.

A swept test carrier frequency signal and a fixed reference carrier frequency signal are amplitude modulated by the same "split" frequency and are applied to the transmission section under test in a periodically alternating sequence. In addition, the reference carrier frequency signal is modulated by an identifying signal. After passing through the transmission section under test, the envelopes of both signals will have suffered a time delay as well as an amplitude degradation relative to each other which are caused by the frequency dependent group delay and attenuation characteristics of the transmission path under test. It should be noted, that the absolute values of group delay and attenuation are of no interest and that the relevant measurement information is truly preserved in the alternating envelope signals as long as the ratio of amplitude levels and the difference of time delays of subsequent envelope periods is maintained.

Subsequently, the overall function of a preferred configuration of the various circuit components to be described later is explained with reference to FIG. 1. This figure illustrates schematically a network for third point measurements of at least one of group delay and attenuation distortions over an extended transmission section under test.

Two distant subscriber locations A and B are connected by a four-wire network passing through a central office C where equalizers E1, E2 are inserted into the wiring. One major problem solved by this invention is to make measurements of departing, remote, or arriving transmission sections, from the central office without the necessity that any personnel be included in that measurement at any point of the network outside the central office.

In order to test the connection from point A to point B, an operator at the central office C breaks the equalizer connections by setting the contacts of switches S1 and S2 into the illustrated positions, while the contacts of switches S3 and S4 remain in the illustrated positions. Then a local transmitter T1 is caused to transmit a remote control signal to a remote receiver R1. By means of an interfacing circuit J1, this control signal causes a transmitter at the location of the remote receiver to apply a test signal at point A to the transmission section under test. As will be explained later, all characteristics of this test signal which are relevant to the measurement of at least one of frequency dependent group delay and attenuation distortions, are specified by the control signal from the local transmitter T1.

The test signal at point A passes via point C1, the equalizer E2 being introduced by switches S3 and S4, points C2 and B to remote end receiver R2. The receiver R2 derives an envelope signal which contains the information about the relative group delay and attenuation of the transmission section A-B. This envelope signal is remodulated onto a fixed-frequency carrier signal by means of an interfacing circuitry J2 and a remote end transmitter T3 which retransmits this signal over the distance B' to C2', where at least one of its group delay and attenuation distortions are measured in a local receiver R3. All the registered group delay and attenuation distortions occurred between points A and B, while the control section between the points C1' and A', and the retransmission section between the points B' and C2' contribute nothing. Thus, the operator may confidently adjust the equalizer E2.

In a corresponding manner, the operator could measure the transmission section between points A' and B' by simply reversing switches S1 through S4. Of course, switches S1 and S2, or S3 and S4 could be mechanically linked or could take the form of patching jacks, plugs and sockets, screw terminals or other means of connection and disconnection.

According to this invention the selection of the transmission section to be tested and thus the kind of slave function, namely "remodulation mode" or "remote control mode" can be made by an operator at the central office without the need for any personnel outside the central station during the measurement.

Now, the various system components will be explained, starting for simplicity with the "normal" operation mode of any of the receivers R1 through R3 in FIG. 1.

Figure 2:
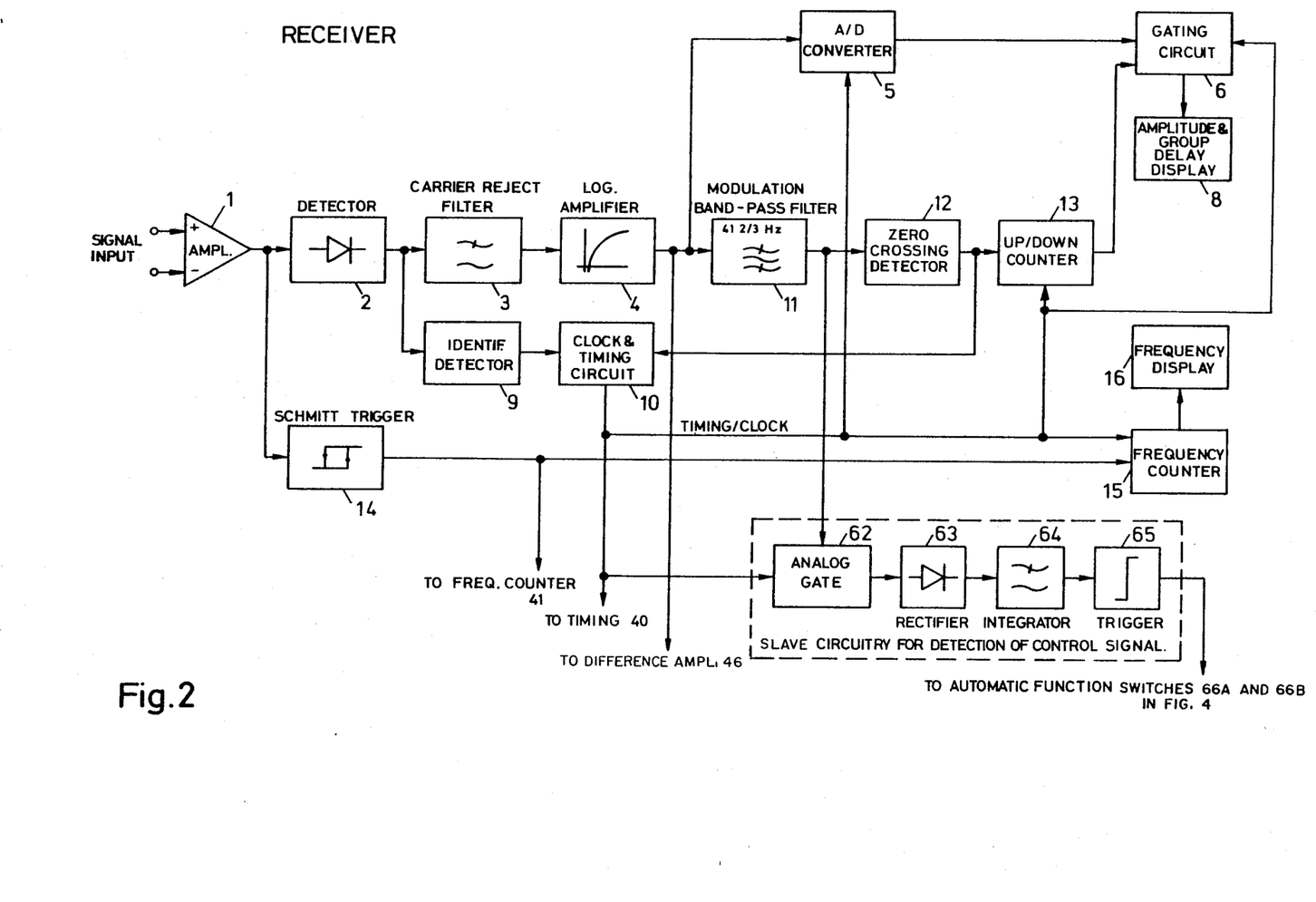
FIG. 2 is a block diagram of the circuitry of each of the receivers shown in FIG. 1 with the slave function circuitry of the remote receivers shown within a dashed outline.

FIG. 2 shows that in operation, an input signal is supplied to an amplifier 1 which, in the typical case, is an amplitude modulated carrier frequency signal, the frequency of which is switched at intervals of 120 ms between a swept measurement frequency and a fixed adjustable reference frequency. Both carrier frequencies are modulated by a so-called split frequency of 41⅔ Hz. In addition, during the last 24 ms of each reference period a 166⅔ modulation burst, usually referred to as the identification frequency, is applied to the reference carrier inorder to allow the receiver to identify the reference frequency as such. As these composed signals have passed through the transmission section under test, the split frequency envelopes of the measuring carrier and reference carrier frequencies will have suffered different amplitude and phase variations due to the attenuation and group delay characteristics of the transmission path under test at these two carrier frequencies. As these frequencies are switched at a change-over rate of 4 1/6 Hz, the amplitude and group delay signals to be measured will be periodic in form.

The signals from the amplifier output the full-wave rectified by a detector 2. The output signal from the detector 2 is applied to a carrier reject filter 3 for removing all frequency components above 41⅔ Hz. A log amplifier 4 is connected to the carrir reject filter 3 and derives a logged signal in dB. As the modulation depth of the 41⅔ split frequency component is permanently kept at 40% of the level of each carrier signal, the alternating 41⅔ Hz component of the output signal from the log amplifier ·· has a constant level regardless of the actual value of the mean carrier level.

The output signal from the log amplifier 4 is, on the one hand, passed through a circuit for measuring amplitude distortions, and is, on the other hand, passed through a circuit for measuring group delay distortions. For the purpose of measuring amplitude distortions, i.e. the difference between the amplitude of the carrier during reference and measuring periods, the variations in amplitude of the carrier caused by the split frequency modulated thereon must be ignored. Accordingly, the log amplifier output, which is a DC voltage with a ripple in it due to the split frequency, is applied to on A/D converter 5. This A/D converter is controlled by a clock and timing circuit 10 to integrate the log amplifier output over a 24 ms period during part of the reference and measuring periods. As 24 ms is the period of the split frequency, the effects thereof are removed by this integration. The circuit 5 further operates to subtract, by the known process of dual slope integration, the result of the integration performed during each measuring period from the result obtained during each reference period. The difference obtained is the amplitude distortion and this is digitized in the A/D converter 5, and is then gated to an amplitude display unit 8 via a gating circuit controlled by impulses from the clock and timing circuit 10. The synchronization of circuit 10 is effected by means of an identification detector 9 that triggers at each received identification burst.

For the purpose of measuring group delay distortions, the output signal from the log amplifier 4 is supplied to a modulation band-pass filter 11 having its center frequency at 41⅔ Hz, so that the modulation envelopes are passed therethrough, and from there to a zero-crossing detector 12, then to an UP/DOWN counter 13, then to the gating circuit 6 and then to the display unit 8 for the indication of relative amplitude and group delay distortions between subsequent envelope signals. The UP/DOWN counter 13 counts clock impulses from the clock and timing circuit 10 and gets timing signals therefrom which establish time windows. It is only during these time intervals that the occurrence of impulses from the detector 12 causes the counter 13 to start or stop or change direction of counting. By the combination of the zero-crossing detector 12 and the UP/DOWN counter 13, under the control of the clock and timing circuit 10, the time delay between specified points of subsequent split frequency modulation envelopes is measured in a novel manner disclosed in the pending U.S. patent application entitled "Method and Apparatus for Measuring Group Delay Distortions," and filed on the same day as this application by the same assignee. The contents of that application are hereby incorporated by reference.

The output signals from the A/D converter 5 in the amplitude measuring circuit and from the UP/DOWN counter 13 in the group delay measuring circuit are selectively passed to the related sections of the amplitude and group delay display unit 8 by a not illustrated front panel switch.

The receiver further includes a frequency measuring circuit with a Schmitt-trigger 14 connected to the output of amplifier 1, a frequency counter 15, and a frequency display unit 16. The circuit 10 controls the counter 15 so that it counts either during reference periods or during measuring periods so that either the reference carrier frequency or the measuring carrier frequency is counted. Selection of which frequency is to be counted is by means of a switch on the front panel of the equipment (not shown).

Figure 3:
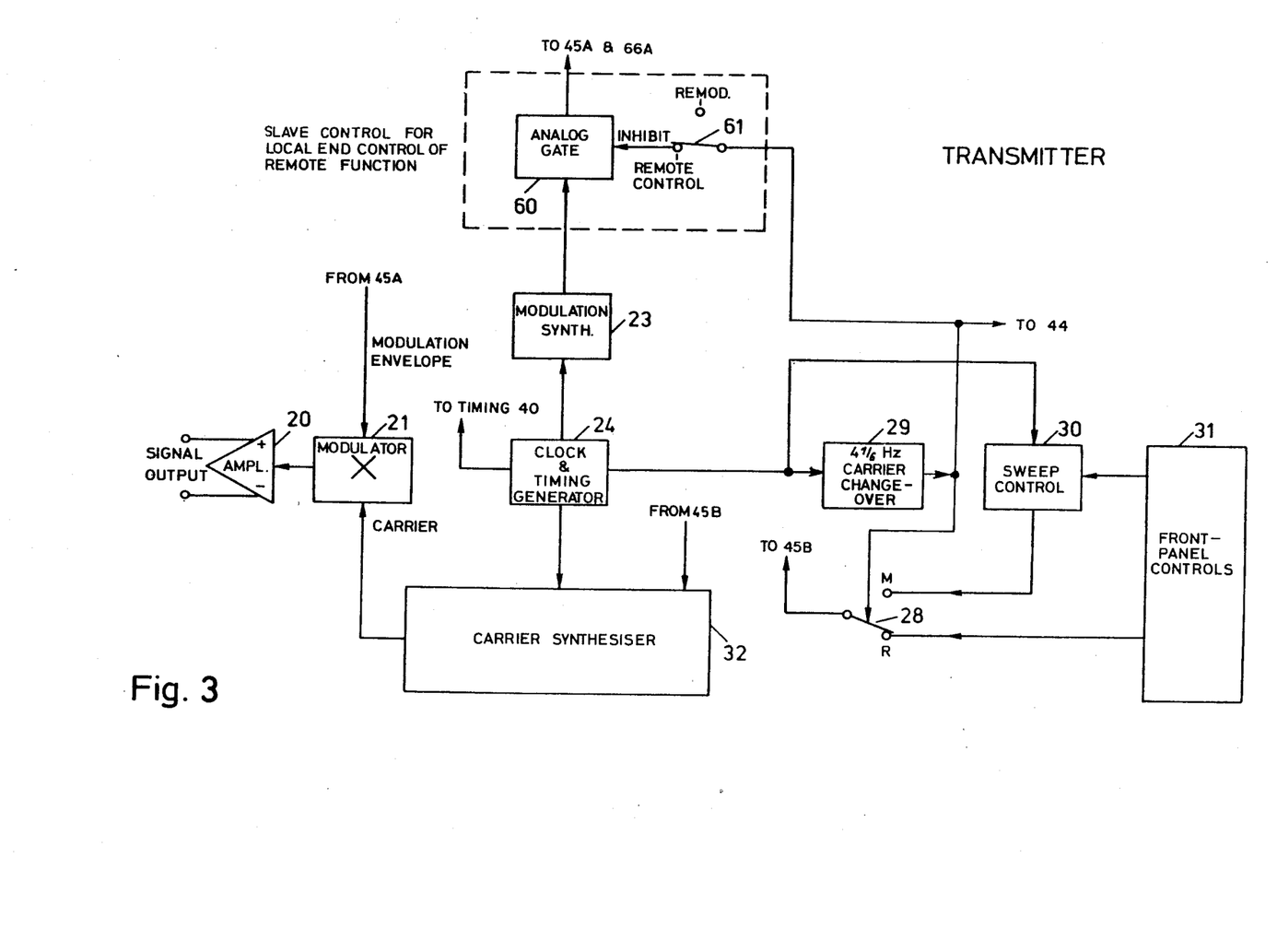
FIG. 3 is a block diagram of the circuitry of each of the transmitters shown in FIG. 1 with the slave control circuitry of the remote transmitters shown within a dashed outline.
Figure 4:
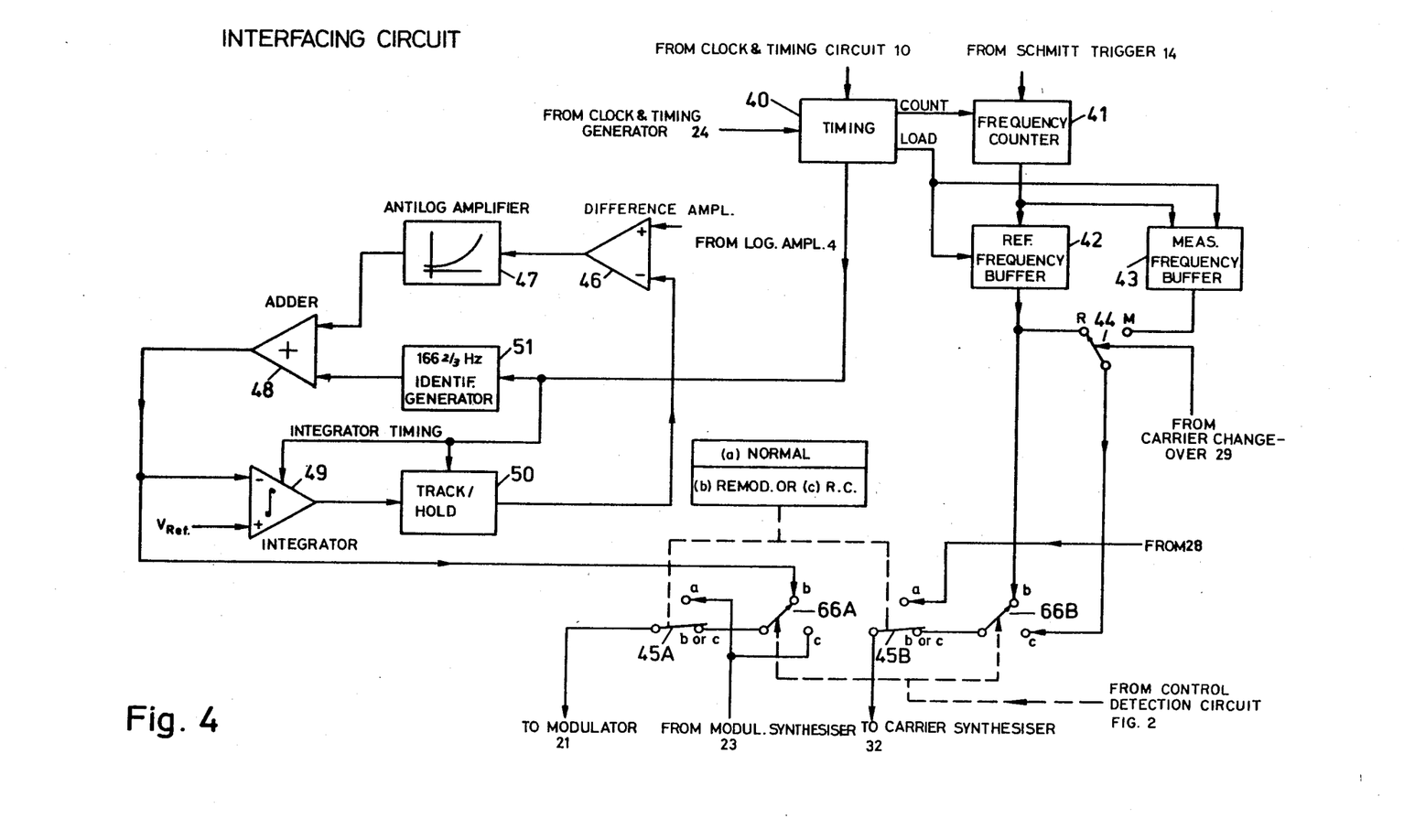
FIG. 4 is a block diagram of each of the interfacing circuits of FIG. 1.

Turning now to FIG. 3 and 4, the operation of interfacing circuits J1 or J2 connected to a corresponding transmitter, T2 or T3, respectively, for the selective retransmission of receiver signals in the remodulation mode will be explained under the assumption that all switches in FIG. 4 are in the illustrated positionss. The retransmission of signals is basically performed by deriving analog envelope signals containing relative phase and amplitude information from the corresponding receiver, generating a reference carrier with a fixed level in the transmitter of FIG. 3 and remodulating the reference carrier by the derived envelope signals.

The fixed reference carrier signal is generated as follows: A frequency counter 41 is connected to the Schmitt trigger 14. A timing circuit 40, which in turn is controlled both by the clock and timing circuit 10, and by a clock and timing generator 24 in the transmitter of FIG. 3, causes a frequency counter 41 to count alternately the reference and measuring frequencies. The output of frequency counter 41 is BCD-coded frequency information that alternately corresponds to the reference and measurement carrier frequencies. Under the control of the timing circuit 40, a reference frequency buffer 42 selects and stores BDC-coded values related to the reference carrier frequency received from the frequency counter 41. This digital frequency information is supplied to a carrier frequency synthesizer 32 in the transmitter via switches 66B and 45B. The synthesizer 32 typically generates a sine wave carrier frequency signal, the frequency corresponding to the actual count of the reference buffer 42, while its amplitude is set to a preselected fixed value. Since the timing circuit 40 is controlled by both generators 10 and 24, the operations controlled by circuit 40 are properly related to the operations taking place both in the corresponding transmitter and receiver.

The signal envelope to be remodulated is derived as follows: The output signal of log amplifier 4 (which, it will be recalled, is a DC voltage with a ripple superimposed upon it due to the split frequency envelope) is supplied to a level control circuit including a subtractor in the form of a difference amplifier 46, then to an antilog amplifier 47, then to a detection and comparison circuit in the form of an integrator 49, via an adder 48 and then to a track/hold circuit 50 being connected between the integrator 49 and the inverting input of the difference amplifier 46. The function of the level control circuit is to adjust the level of the DC component of the signal from the log amplifier 4, as necessary, to ensure this level is the same in each reference period, but without altering the relative levels of this DC component during measuring and reference periods, since it is the ratio of the levels which represents attenuation distortion to be measured. The signal at the non-inverting input of the difference amplifier 46 is related to the log of the level of alternating split frequency envelope sections. Thus, the relative carrier amplitude and the split frequency phase information are truly preserved although the unwanted absolute amplitude information is lost. Per definition, the antilog amplifier 47 has an inverse log characteristic to that of the log amplifier 4. The output of the antilog amplifier 47 is passed to the inverting input of the integrator 49 via an adder 48. The non-inverting input of the integrator 49 is kept at a reference potential. The integrator 49 has a timing input connected to the timing circuit 40 which enables the integrator only during a 24 ms period close to the end of the received reference period signal. Since 24 ms is the period of the split frequency, the integrator measures the level of the DC component. Thus the mean level of the envelope signal (i.e. the level of the D.C. component) during the reference period is constrained to be equal to the reference voltage applied to the non-inverting input of the integrator 49. In case the output level from the antilog amplifier 47 differs from the level of the reference voltage during the reference period, then the integrator 49 output signal will change and will cause a change of the signal at the inverting input of the difference amplifier 46. Thus a change of the amplification factor of the entire loop will be caused with a polarity such that the difference of the signals at the inputs of integrator 49 will virtually disappear. The output signal of this level control loop is supplied via switches 66A and 45A to a modulator 21. This output signal is in effect multiplied with the reference carrier signal from the carrier frequency synthesizer 32 in the modulator 21 so that a remodulated signal is obtained which has a constant preselected reference carrier level that is independent of the amplitude of the received reference carrier signal.

It is important to note that the output signal of track and hold circuit 50 remains constant when integrator 49 is not enabled by timing circuit 40. Thus the gain of the loop has been set upon a given operation of integrator 49 so that the gain remains constant until after the next operation of integrator 49, i.e. the same gain is maintained during each pair of adjacent reference and measuring periods. Thus the same amplification is applied to the envelopes of the received measuring and reference carrier signals and thus the relative group delay and attenuation of the received measuring and reference signals are preserved after the retransmission of the remodulated signals. Therefore, benefit is derived from the fact that the absolute values of the received modulated carrier signals are of no interest for the measurement of the attenuation and group delay characteristics.

As the carrier reject filter 3 has not only removed carrier frequency components, but also the identification frequency, this information has to be reapplied to the envelope of the reference carrier. For this purpose, an oscillator 51 is connected to the adder 48 and generates an identification frequency, the timing thereof is controlled by an identification detector 9 via the clock and timing circuit 10, and the timing circuit 40. The timing signals from the clock and timing circuit 10 are derived from the impulses at the output of the zero-crossing detector 12.

Subsequently, the "normal" transmitting mode of the transmitter, e.g. the local transmitter T1, can be explained if it is assumed that switches 45A and 45B of FIG. 4 have been switched to positions a.

A front panel control unit 31 provides a sweep control circuit 30 with digital information corresponding to the lower and upper sweep limits, the sweep speed and sweep direction. The sweep control circuit 30 actually delivers a binary code corresponding to the instantaneous measurement carrier frequency required. Furthermore, the front panel control unit 31 provides BCD-coded information corresponding directly to the reference frequency so tht a schematically illustrated electronic multiplexer 28 receives at its inputs, M and R, binary signals corresponding to the measuring and reference carrier frequencies, respectively. Under the control of the clock and timing generator 24, an oscillator 29 supplies a change-over signal of 4 1/6 Hz to control the switching operation of the multiplexer 28. Thus, the two carrier frequencies are supplied to the carrier synthesizer 32 via switch 45B at alternate time intervals of 120 ms to provide a corresponding sine wave to the carrier signal input of the amplitude modulator 21.

Under the control of the same clock and timing generator 24, a modulation synthesizer 23 supplies a modulation frequency signal of 41⅔ Hz (split frequency) including, periodically, the identification bursts to a modulating input of the amplitude modulator 21. Thus, a transmitter test signal is available at the output of modulator 21.

The precedingly explained generation of a test signal by the local transmitter is similar to the generation of a test signal by the remote transmitter, e.g. the transmitter T2, in the remote controlled operation, which will be explained subsequently. It is now assumed that the manual switches 45A, 45B and the schematically illustrated electronic switches 66A and 66B are set into the positions c (FIG. 4).

Under the control of the timing circuit 40, the frequency counter 41 supplies BCD-coded frequency information that alternately corresponds to the reference and measuring carrier frequencies. The timing circuit 40 gives load instructions to the reference frequency buffer 42 and a measuring frequency buffer 43 in order to open the buffer 42 when the reference carrier frequency is available while the buffer 43 is opened when the measuring carrier frequency is available, both in BCD-coded form. So, the same binary information about the reference and measurement carrier frequencies, as was obtained at the input of the multiplexer 28 in the "normal operation" mode, is now available at the inputs of a schematically illustrated electronic multiplexer 44. This frequency information is passed to the carrier frequency synthesizer 32 via the c contacts of the switches 66B and 45B. The further operation of the modulation synthesizer 23 and of the modulator 21 corresponds exactly to the previously discussed normal transmitting mode of the local transmitter. Consequently, a test signal is generated with remote controlled values of the measuring and reference carrier frequency.

Now, it will be explained, how the output signals from the local transmitter T1 are modified in order to selectively determined which of the transmitters T2 and T3 should operate in the "remote control" mode and which of these transmitters should operate in the "remodulation mode".

It is supposed that the contacts of the manually operable switches 45A and 45B of the interfacing circuits J1 and J2 are in the positions b/c. It should be noted that the schematically illustrated electronic switches 66A and 66B are automatically actuated by the interaction of the slave function control circuitry within the dashed outline of FIG. 3 and FIG. 2 with the interfacing circuit of FIG. 4.

Figure 1:
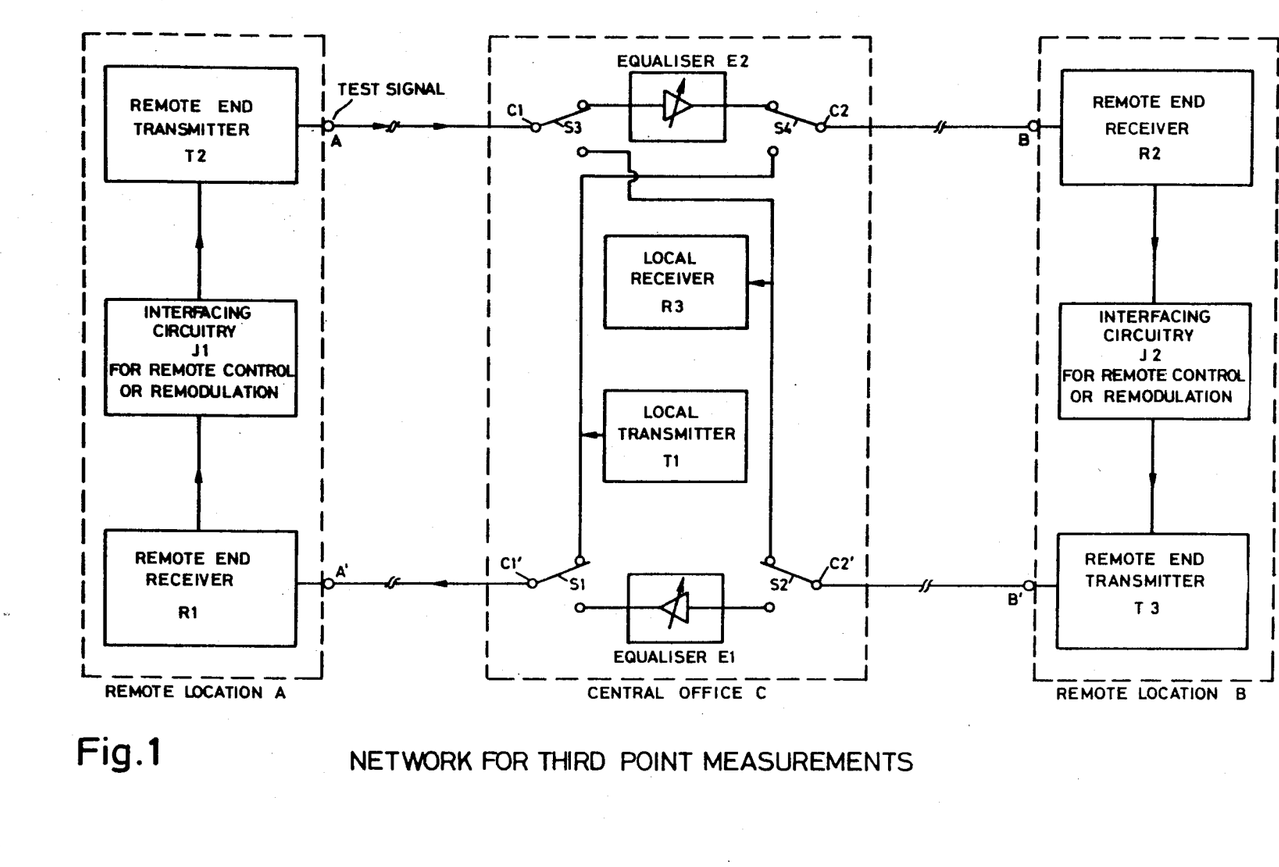
FIG. 1 is a block diagram of the network of the present invention.

The assembly of the transmitter and of the slave function control circuitry of FIG. 3, being schematically illustrated within a dashed outline, may be incorporated in the local transmitter T1 of FIG. 1, while the assembly of the receiver and of the slave function detector circuitry of FIG. 2 being schematically illustrated in dashed outline may be incorporated in the remote receiver R1 of FIG. 1.

An analog gate 60 is connected between the modulation synthesizer 23 and the modulating input of the modulator 21 via switches 66A and 45A. The output of the carrier changeover oscillator 29 providing the changeover frequency for the carrier signal is connectable to an inhibit input of the analog gate 60 via a manually operable slave function mode switch 61 which has a remodulation position and a remote control position. In the remote control mode, the mode switch 61 is closed and thus changeover square-wave signals of 4 1/6 Hz are applied to the inhibit input of analog gate 60 during the measuring carrier periods with the resultant effect being that the modulation envelope of the reference carrier signals remains unaffected.

Now reference is made to the remote control detector function of FIG. 2 to explain how the remote control signal, i.e. the absence of the 41⅔ Hz modulation during the alternating periods of the measuring frequency carrier, is used to derive a trigger signal in the detector.

The detector circuit within the dashed outlines of FIG. 2 includes an analog gate 62 with inputs from the clock and timing circuit 10 and the modulation bandpass filter 11, then a rectifier 63, then an averager or integrator in the form of a low pass filter 64, and finally a Schmitt-trigger 65. The operation of this detector circuit is as follows: The clock and timing circuit 10 enables the analog gate 62 periodically during a part of the measuring period. If the mode switch 61 is closed, and thus the remote control mode is established, no modulation envelope is detected and the output of analog gate 62 is zero. If on the other hand, switch 61 is opened, thus establishing the remodulation and retransmission mode, a modulation burst will pass the gate 62 and, after rectification and averaging, will actuate Schmitt-trigger 65 to generate a trigger signal. This trigger signal acts on the schematically illustrated electronic switches 66A and 66B so that the usually closed connections via the contacts c of the switches 66A and 66B are interrupted and the connections via contacts b of these switches are established. This means that the switches 66A and 66B are usually set for the remote control mode in which the modulation synthesizer 23 is connected to the modulating input of the output modulator 21 via switches 66A and 45A, while the carrier synthesizer 32 is connected to the schematically illustrated electronic multiplexer 44 via switches 66B and 45B, so that the carrier synthesizer 32 will periodically supply the carrier input of the modulator 21 with sine wave signals at the measuring and reference frequencies as received from the local receiver. However, upon signals from the Schmitt-trigger 65, switch 66A connects adder 48 in the interface circuit to the output modulator 21 via switch 45, and switch 66B connects the carrier synthesizer 32 to the reference frequency buffer 42 via switch 45B, thus establishing the remodulation mode.

Various modifications are possible within the scope of the invention. For example, although the apparatus described is capable of measuring both frequency dependent group delay and attenuation distortions, apparatus embodying the invention could be designed for measuring only one of these kinds of distortion. If the apparatus were to be designed for simply measuring attenuation distortion, it would be possible to dispense with the split frequency as such since the quantities of interest would then only be the relative amplitudes of the received test signal during measuring and reference periods. However, if the split frequency were dispensed with, in such an embodiment, it would be necessary to include some alternative form of instruction signal to instruct the remote receiver-transmitter set which mode to operate in. Such an alternative instruction signal would preferably, however, still reside in the provision of amplitude modulation in either the reference or the measuring periods so as to contain information as to the frequencies to be used in the test signal to be generated by the remote set.

Although in the embodiment illustrated in the drawings, the instruction signal to tell the remote transmitter which mode to operate it has been constituted by suppressing modulation of the carrier during measurement periods, other forms of an instruction signal could be employed. If an instruction signal containing no information on the frequencies to be generated by the remote set were to be employed, the remote set could be designed to generate predetermined frequencies, for example to sweep automatically the measurement carrier frequency through selected values, upon receipt of the instruction signal.

Although the receiver-transmitter set illustrated in the drawings is capable of operation as a control station or as a remote station, it would be possible to design sets within the scope of the invention some of which are operable only as the control station and others which are operable only as remote stations. However, sets capable of both functions are preferred. If each receiver and transmitter is capable of operation as either a remote or a control unit, then it would be possible to conduct the tests with the local transmitter at one location and the local receiver at another location.

I claim:
1. A circuit arrangement for selectively measuring frequency dependent group delay of any of a plurality of transmission sections connected in a transmission loop, said circuit comprising:
   a local receiver-transmitter set for location at a control station, said local receiver-transmitter set including:
      a local transmitter; and
      a local receiver;
   a remote receiver-transmitter set for location at a remote station, said remote receiver-transmitter set including:
      a remote transmitter;
      a remote receiver; and
      an interfacing circuit connected therebetween;
   said plurality of transmission sections including:
      a first transmission section between the local transmitter and the remote receiver; and
      a second transmission section between the remote transmitter and the local receiver;
   said local and remote transmitters each including carrier changeover frequency means for supplying in a periodically alternating sequence, a swept test carrier frequency signal and a preferably fixed reference carrier frequency signal, both carrier signals being amplitude modulated by the same modulating frequency;
   said local transmitter further comprising slave control circuit means including a first manually operable mode switch having two positions for selectively modifying the output signal from the modulator means of the local transmitter to establish one of two different signal conditions in response to the manual setting of the first manually operable mode switch, said first manually operable mode switch is connected to said carrier changeover frequency means of the local transmitter for selecting one of two modes of "slave control" operation, said two modes being "remote control" of the remote transmitter in the transmission path preceding the transmission section selected for testing and "remodulation" of the measurement signal of a selected transmission section obtained at the remote receiver onto a reference carrier signal for retransmission to any receiver later in the transmission path;
   said local and remote receivers each including:
      first circuit means for recovering modulation envelope signals;
      second circuit means for deriving a measuring signal related to the group delay time or the phase shift between the two alternating envelope periods as an indication of the group delay of the selected transmission section under test; and
      third circuit means for synchronizing the above two circuit means by various clock and timing signals; and
   said interfacing circuit including:
      a second manually operable mode switch connected to the remote transmitter for selecting one of the two remote receiver-transmitter set operation modes, said two modes being a "nor- mal" operation mode and a "remote control"-/"remodulating" mode;

an automatically operable mode switch connected to the second manually operable mode switch and responsive to a signal from the slave control circuit means of the local transmitter via the remote receiver to select between the "remote control" mode and the "remodulation" mode of operation for the remote transmitter when the second manually operable mode switch is in the "remote control"/"remodulation" mode; and circuit means connected to the remote receiver and connectable to the remote transmitter for inputting carrier and modulation signals to the remote transmitter, said remote transmitter being connectable to said circuit means via both the second manually operable mode switch and the automatically operable mode switch.

2. The circuit arrangement as in claim 1 wherein said local and remote receivers each further include fourth circuit means for deriving a measuring signal related to the ratio of the amplitudes of the envelope signal of the two alternating envelope periods as an indication of the attenuation distortion of the selected transmission section under test.

3. A circuit arrangement for selectively measuring frequency dependent group delay of any of a plurality of transmission sections connected in a transmission loop, said circuit comprising:

a local receiver-transmitter set for location at a control station, said local receiver-transmitter set including:
 a local transmitter; and
 a local receiver;
a pair of remote receiver-transmitter sets for location at two separate remote stations, each of said remote receiver-transmitter sets including:
 a remote transmitter;
 a remote receiver; and
 an interfacing circuit connected therebetween;
said plurality of transmission sections of said transmission loop including:
 a first transmission section between the local transmitter and the remote receiver of a first of the remote receiver-transmitter sets; and
 a second transmission section between the remote transmitter of the first of the remote receiver-transmitter sets and the remote receiver of a second of the remote receiver-transmitter sets;
said local and remote transmitters each including:
 modulator means for modulating the output signal of the transmitter; and
 carrier changeover frequency means including a carrier synthesizer for supplying in a periodically alternating sequence, a swept test carrier frequency signal and a preferably fixed reference carrier frequency signal, both carrier signals being amplitude modulated by the same modulating frequency;
said local transmitter further comprising slave control circuit means including a first manually operable mode switch having two positions for selectively modifying the output signal from the modulator means of the local transmitter to establish one of two different signal conditions in response to the manual setting of the first manually operable mode switch, said first manually operable mode switch is connected to said carrier changeover frequency means of the local transmitter for selecting one of two modes of "slave control" operation, said two modes being "remote control" of each remote transmitter in the transmission path preceding the transmission section selected for testing and "remodulation" of the measurement signals of a selected transmission section obtained at a remote receiver onto a reference carrier signal for retransmission to any receiver later in the transmission path;

said interfacing circuits each including:
 a second manually operable mode switch connected to the corresponding remote transmitter for selecting one of the two remote receiver-transmitter operation modes, said two modes being a "normal" operation mode and a "remote control"/"remodulation" mode;
 an automatically operable mode switch connected to the second manually operable mode switch and responsive to a signal from the slave control circuit means of the local transmitter via the corresponding remote receiver to select between the "remote control" mode and the "remodulation" mode of operation for the corresponding remote transmitter when the second manually operable mode switch is in the "remote control"/"remodulation" mode; and
 circuit means connected to the remote receiver and connectable to the remote transmitter of the same receiver-transmitter set as the interface circuit for inputting carrier and modulation signals to the corresponding remote transmitter, said remote transmitter being connectable to said circuit means via both the second manually operable mode switch and the automatically operable mode switch;

each receiver including:
 first circuit means for recovering modulation envelope signals;
 second circuit means for deriving a measuring signal related to the group delay time or the phase shift between the two alternating envelope periods as an indication of the group delay of the selected transmission section under test; and
 third circuit means for synchronizing the above two circuit means by various clock and timing signals; and said remote receivers each further including slave control detection means connected to the interfacing circuit of the same receiver-transmitter set for detecting one of two signal conditions of the modulator output signal from the local transmitter and establishing circuit connections between the corresponding remote transmitter and remote receiver via the corresponding interfacing circuit for conditioning said remote transmitter to operate in the corresponding one of two modes, said modes of operation being the "remodulation" mode and the "remote control" mode.

4. The circuit arrangement as in claim 3 wherein each receiver further includes fourth circuit means for deriving a measuring signal related to the ratio of the amplitudes of the envelope signal of the two alternating envelope periods as an indication of the attenuation distortion of the selected transmission, section under test.

5. The circuit arrangement as in claim 3, wherein said plurality of transmission sections of said transmission loop further comprises a third transmission section between the remote transmitter of the second remote receiver-transmitter set and the local receiver closing the transmission loop between the local transmitter and the local receiver via the remote receiver-transmitter sets.

6. The circuit arrangement as in claim 5, wherein the first circuit means of each receiver includes a log amplifier as the final element of the circuit means for producing a logged envelope measuring signal with a constant level that is representative of the split frequency modulation on the received signal.

7. The circuit arrangement as in claim 5, wherein the output of the slave control circuit means of the local transmitter is connected to the modulation envelope input of the modulator means in the local transmitter.

8. The circuit arrangement as in claim 7, wherein the slave control circuit means of the local transmitter further comprises an analog gate circuit connected between one output and one input of the modulation means of the local transmitter having a controlled input connected to said first manually actuable mode switch, said first manually actuable mode switch being connected to the output of said carrier changeover frequency means of the local transmitter for inhibiting the analog gating circuit during the transmission period of the swept test carrier frequency so that the carrier will be unmodulated during this test carrier period when said switch is in one of the two switch positions, and when said switch is in the other of the two switch positions the carrier will be modulated normally during both carrier frequency periods.

9. The circuit arrangement as in claim 5, wherein said slave control signal detector means of each remote receiver includes an analog gate circuit responsive to a demodulated envelope signal of said third circuit means and under the control of a timing signal of said fourth circuit means of the same remote receiver so that the output of the analog gate circuit is the demodulated envelope signal limited to the swept test carrier period defined by the timing signal, said modulation during the swept test carrier period being determined by the selected position of the first manually operable mode switch of the slave control circuit means of the local transmitter.

10. The circuit arrangement as in claim 9, wherein said slave control signal detection means further includes:
a rectifying circuit responsive to the output of the analog gate circuit;
an averaging circuit responsive to the output of the rectifying circuit; and
a trigger circuit responsive to the output of the averaging circuit at a preselected signal level.

11. The circuit arrangement as in claim 10, wherein the slave control signal detector means upon receipt of a demodulation signal with a level below the preset trigger level during the swept test carrier priod of the received signal generates a first output signal causing said automatically operable mode switch in the corresponding interfacing circuit to establish circuit connections for the "remote control" operating mode of the corresponding remote transmitter, and said detector means upon receipt of a demodulated signal with a level above the preset trigger level during the swept test carrier period of the received signal generates a second output signal causing said automatically operable mode switch in the corresponding interfacing circuit to establish circuit connections for the "remodulation" operating mode of the corresponding remote transmitter.

12. The circuit arrangement according to claim 5, wherein each interfacing circuit means comprises:
level control circuit means for supplying a remodulating signal to the modulation envelope input of the modulator means of the corresponding remote transmitter including:
an amplifier responsive to a measurement signal representative of the alternating modulated envelope signals from said first circuit means of the corresponding remote receiver;
means for reconstructing the modulation envelope signal from the output of the amplifier that establishes the desired mean level of the remodulating signal during the reference periods; and
signal processing means closing a feedback loop to the amplifier responsive to the reconstructed modulation envelope signal and a reference level signal for determining the mean level of the remodulation signal during the reference periods responsive to the desired value under the control of the reference signals; and
means for supplying a selected reference carrier frequency signal to the corresponding remote transmitter including:
timing and counter means connected to the remote receiver for deriving a signal representative of the reference carrier frequency; and
buffer and switching means responsive to the timing and counter means for providing a periodically updated constant level measure of the reference carrier frequency to the carrier synthesizer of the carrier changeover frequency means of the corresponding remote transmitter to generate a synthesized carrier frequency that is then modulated by the modulated means of the same remote transmitter with a signal from the means for reconstructing the modulation envelope signal that contains the true relative attenuation and group delay information, if present, of the signal received by the corresponding remote receiver.

13. The circuit arrangement as in claim 12, wherein the signal processing means of the level control circuit means comprises a level detection and comparison circuit responsive to the reconstructed modulation envelope signal and to reference signals during the reference period to derive a loop gain control signal for a second input of the amplifier, said loop gain being adjusted to maintain a predetermined relation between the reference signal and the mean remodulating signal during the reference periods.

14. The circuit arrangement as in claim 13, wherein the amplifier is a differential amplifier having as a first input signal a logged envelope measuring signal from the first circuit means of the corresponding remote receiver and as a second input signal the loop gain control signal from the level detection and comparison circuit of the signal processing means.

15. The circuit arrangement as in claim 13, wherein said means for reconstructing the modulation envelope signal of the level control circuit means of the interfacing circuit comprises an antilog amplifier connected on the input to the differential amplifier and on the output to the level detection and comparison circuit, the antilog amplifier having a log characteristic that is the inverse of the log characteristic of the log amplifier of the corresponding remote receiver.

* * * * *

Page 1 of 2 pages

UNITED STATES PATENT AND TRADEMARK OFFICE

CERTIFICATE OF CORRECTION

PATENT NO. : 3,988,678
DATED : October 26, 1976
INVENTOR(S) : Stephen R. Hodge

It is certified that error appears in the above-identified patent and that said Letters Patent are hereby corrected as shown below:

Column 2, line 19, "transmissions ection(s)" should read -- transmission section(s) --;

Column 6, line 17, "inorder" should read -- in order --; line 33, "carrir" should read -- carrier --; line 38, delete "..."; at approximately line 52 "to on A/D" should read -- to an A/D --;

Column 7, line 47, "positionss" should read -- positions --; line 65, "BDC" should read -- BCD --;

Column 9, line 36, "tht" should read -- that --;

Column 10, line 13, "normal" should be in quotation marks; line 20, "determined" should read -- determine --; lines 47 and 48, "remodulation" should be in quotation marks; "remote control" should be in quotation marks;

Column 11, line 53, "operate it" should read -- operate in --;

Column 12, line 49, "signal" should read -- signals --;

Column 14, line 65, after "transmission" delete -- , --;

UNITED STATES PATENT AND TRADEMARK OFFICE
CERTIFICATE OF CORRECTION

PATENT NO. : 3,988,678
DATED : October 26, 1976
INVENTOR(S) : Stephen R. Hodge

It is certified that error appears in the above–identified patent and that said Letters Patent are hereby corrected as shown below:

Column 15, line 57, "demodulation" should read -- demodulated --;

Signed and Sealed this

Eighth Day of February 1977

[SEAL]

Attest:

RUTH C. MASON
Attesting Officer

C. MARSHALL DANN
Commissioner of Patents and Trademarks